US007430626B2

(12) United States Patent  (10) Patent No.: US 7,430,626 B2
Hedin  (45) Date of Patent: Sep. 30, 2008

(54) BI-DIRECTIONAL DATA CONTROL STATE MACHINE

(75) Inventor: John M. Hedin, Coon Rapids, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 79 days.

(21) Appl. No.: 11/343,053

(22) Filed: Jan. 30, 2006

(65) Prior Publication Data

US 2007/0180175 A1  Aug. 2, 2007

(51) Int. Cl.
G06F 13/36 (2006.01)
(52) U.S. Cl. .................... 710/116; 710/106; 713/502; 370/462
(58) Field of Classification Search ......... 710/110–116, 710/119, 8–10, 106; 713/502; 370/462
See application file for complete search history.

(56) References Cited

U.S. PATENT DOCUMENTS 4,577,273 A * 3/1986 Hopper et al. .............. 710/114

| 6,141,683 | A | 10/2000 | Kraml et al. |
| 6,467,009 | B1* | 10/2002 | Winegarden et al. ........ 710/305 |
| 2001/0032249 | A1* | 10/2001 | Worch ........................ 709/208 |
| 2004/0044997 | A1 | 3/2004 | Talati et al. |
| 2004/0092255 | A1 | 5/2004 | Ji et al. |
| 2004/0103340 | A1 | 5/2004 | Sundareson et al. |
| 2006/0253617 | A1* | 11/2006 | Lin et al. ....................... 710/8 |

FOREIGN PATENT DOCUMENTS

WO  02057915  7/2002

* cited by examiner

*Primary Examiner*—Clifford H Knoll
(74) *Attorney, Agent, or Firm*—Fogg & Powers LLC

(57) ABSTRACT

A method for controlling bi-directional data transfers in an electronic circuit is provided. The method involves when a first of at least two data signals is activated as an originating data signal prior to a second of the at least two data signals: allowing only a device associated with the first of the at least two data signals to be a signal source, and causing a device associated with the second of the at least two data signals to enter a receive state as a signal sink. The method further involves passing at least one bit of data from the signal source to the signal sink.

30 Claims, 3 Drawing Sheets

BI-DIRECTIONAL DATA CONTROL STATE MACHINE

CROSS REFERENCE TO RELATED APPLICATION

This application is related to co-pending application Ser. No. 11/229,893, filed on Sep. 19, 2005 and entitled MECHANISM TO UPGRADE SYSTEM CAPABILITY WITHOUT AFFECTING SERVICE (the '893 Application). The '893 Application is incorporated herein by reference.

BACKGROUND

As wireless communications networks evolve, the need to keep a network functional remains critical. Advances in transport technology, particularly digital radio frequency (RF), provide additional performance and improved signal quality demanded by consumers. Traditional wireless network architectures, which rely on equipment upgrades in order to overcome limitations, are being transformed by technologies such as software-defined radio (SDR). With SDR, a radio signal is generated using software rather than traditional radio equipment hardware, and wireless service providers have greater flexibility by programming SDR to provide a broader range of frequencies, bandwidths, and transmission protocols.

With the increase in capability provided by SDR being deployed on digital wideband RF transport systems, new data and video services are being adopted at an ever-increasing rate. As is the case in upgrading a traditional RF network, service is interrupted on digital wideband RF transport systems in order to upgrade the system with new capabilities. Whenever a system upgrade is attempted, there is a risk that a software download to the system is unsuccessful due to an inability to complete the software download in a required amount of time to avoid a system fault.

In order to remedy the inability to complete the software download in the required amount of time, data transfer speed is increased to meet timing requirements. In current situations, increasing the data transfer speed often results in data collision, or crossed feedback, between hardware components in one or more transport units. When this occurs, service personnel are sent on-site to complete the upgrade. The on-site upgrade often results in a replacement of system hardware. Any unsuccessful upgrade in the one or more transport units leads to a potential lengthy downtime throughout the network.

SUMMARY

The above mentioned problems with bi-directional data control and other problems are addressed by embodiments of the present invention and will be understood by reading and studying the following specification. Particularly, in one embodiment, a method for controlling bi-directional data transfers in an electronic circuit is provided. The method involves when a first of at least two data signals is activated as an originating data signal prior to a second of the at least two data signals, allowing only the first of the at least two data signals to be an originating signal and causing the second of the at least two data signals to enter an active output condition as a destination signal. The method further involves when the second of the at least two data signals is activated as the originating data signal prior to the first of the at least two data signals, allowing only the second of the at least two data signals to be an originating signal and causing the first of the at least two data signals to enter an active output condition as a destination signal. As long as the originating data signal is active, the method includes passing at least one bit of data from the originating data signal from a data origin to a data destination.

DRAWINGS

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention address problems with electronic data transfer and will be understood by reading and studying the following specification. Particularly, in one embodiment, a method for controlling bi-directional data transfers in an electronic circuit is provided. The method involves when a first of at least two data signals is activated as an originating data signal prior to a second of the at least two data signals, allowing only the first of the at least two data signals to be an originating signal and causing the second of the at least two data signals to enter an active output condition as a destination signal. The method further involves when the second of the at least two data signals is activated as the originating data signal prior to the first of the at least two data signals, allowing only the second of the at least two data signals to be an originating signal and causing the first of the at least two data signals to enter an active output includes passing at least one bit of data from the originating data signal from a data origin to a data destination.

Although the examples of embodiments in this specification are described in terms of electronic data transfer when upgrading a communications network, embodiments of the present invention are not limited to electronic data transfer when upgrading a communications network. Embodiments of the present invention are applicable to any electronic data transfer activity that incorporates at least one bi-directional data path. Alternate embodiments of the present invention utilize a state machine for bi-directional data control in an electronic device. The state machine is designed to eliminate data collisions when completing a transfer of electronic data between at least two electronic components within a prescribed time frame.

Figure 1:
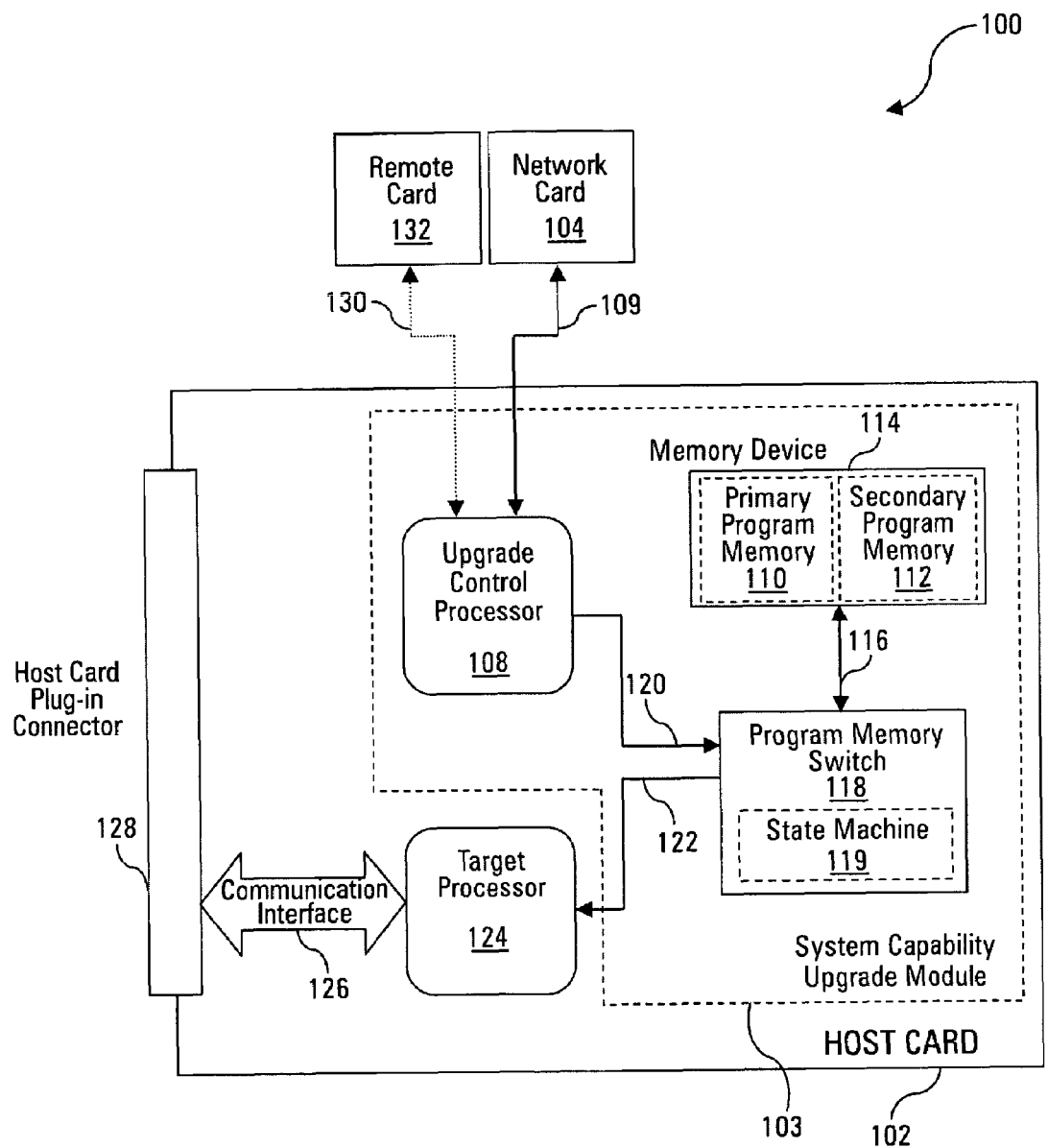
FIG. 1 is a block diagram of an embodiment of a communications system with a system capability upgrade module encompassing a state machine for bi-directional data control in accordance with the present invention.

FIG. 1 is a block diagram of an embodiment of a communications system, indicated generally at 100, with a system capability upgrade module encompassing a state machine for bi-directional data control according to the teachings of the present invention. System 100 comprises host card 102, network card 104, and remote card 132. Host card 102 further includes system capability upgrade module 103, target processor 124, and host card plug-in connector 128. System capability upgrade module 103 further comprises program memory switch 118, memory device 114, and upgrade control processor 108, each of which are discussed in turn below.

Target processor 124 is coupled to host card plug-in connector 128 by communication interface 126. In one embodiment, communication interface 126 is a Peripheral Component Interconnect (PCI)-X interface, an Advanced Telecommunications Computing Architecture (ATCA) interface, a PCI Express interface, a Gigabit Ethernet interface, a Small Computer System Interface (SCSI) interface, a Rocket I/O interface, a User Datagram Protocol/Internet Protocol (UDP/IP) link interface, a Transmission Control Protocol/Internet Protocol (TCP/IP) link interface, a Serial Advanced Technology Attachment (ATA) interface, a CardBus interface, a high speed serial interface, a high speed parallel interface, or the like that transports data bi-directionally between target processor 124 and host card plug-in connector 128.

Target processor 124 is also coupled to program memory switch 118 by target program memory transfer interface 122. In one embodiment, target processor 124 is a microprocessor, a field programmable gate array (FPGA), or the like. In the same embodiment, program memory switch 118 is a programmable logic device, a complex programmable logic device (CPLD), an FPGA, or the like. In one embodiment, program memory switch 118 is implemented with state machine 119. State machine 119 equips program memory switch 118 with bi-directional data control to complete a transfer of one or more sets of software machine-coded instructions, herein referred to as "system operating software," between memory device 114 and target processor 124 within a prescribed time frame. In one embodiment, the prescribed time frame to complete a transfer of one or more sets of software machine-coded instructions is a maximum of 420 ms.

Program memory switch 118 is coupled to memory device 114 by memory transfer interface 116. It is noted that for simplicity in description, a single memory device 114 is shown in FIG. 1. However, it is understood that system capability upgrade module 103 supports any appropriate number of memory devices 114, e.g., 2 or more memory devices, in a single system capability upgrade module 103. In one embodiment, memory device 114 is a flash memory device, a read only memory (ROM) device, an electrically erasable programmable read only memory (EEPROM) device, or any electrical, magnetic, or optical storage device containing at least two memory banks, primary program memory 110 and secondary program memory 112. In the same embodiment, memory transfer interface 116 is a bi-directional communication link under the control of state machine 119. State machine 119 limits communication between target processor 124 and memory device 114 to one direction based on timing instructions received from upgrade control processor 108. State machine 119 prevents a collision of data signals when memory transfer interface 116 transfers one or more sets of system operating software chosen by program memory switch 118 between target processor 124 and memory device 114.

Upgrade control processor 108 is coupled to program memory switch 118 by upgrade instruction interface 120. In one embodiment, upgrade controller processor 108 is a microprocessor, an FPGA, or the like. In the same embodiment, upgrade instruction interface 120 is a direct communication link that initiates a transfer of the system operating software stored in memory device 114. In one embodiment, both primary program memory 110 and secondary program memory 112 contain the same known good version of system operating software. In another embodiment, primary program memory 110 contains a current version of system operating software and secondary program memory 112 contains a core version of system operating software. Moreover, the core version of system operating software allows communications system 100 to continue operating until another system capability upgrade attempt is made. Once upgraded system operating software is received by update control processor 108, program memory switch 118 transfers the upgraded system operating software exclusively to primary program memory 110. Since primary program memory 110 is the only storage medium upgraded on a continual basis, secondary program memory 112 is guaranteed to always have a known good version of system operating software for operating communications system 100 when an upgrade attempt is not successful.

In another embodiment, secondary program memory 112 contains the prior version of system operating software operating in target processor 124. Moreover, the current version of system operating software is stored in primary program memory 110. Prior to any system upgrade of communications system 100, both primary program memory 110 and secondary program memory 112 contain the same version of system operating software, and each time primary program memory 110 is upgraded, the prior version of system operating software is transferred to secondary program memory 112. In yet another embodiment, for each occurrence of a system capability upgrade, program memory switch 118 is instructed to alternate the transfer of a new version of system operating software between primary program memory 110 and secondary program memory 112. Since each subsequent upgrade process will not affect all of the at least two memory banks of memory device 114 each time, the longevity of the at least two memory banks increases by at least a factor of two as described in the '893 application.

Upgrade control processor 108 is further coupled to network card 104 by network card interface 109. In one embodiment, network card interface 109 is a bi-directional communication link that uses twisted pair cable, optical fiber, coaxial cable, millimeter wave, Free Space Optics (FSO), or the like to transmit instructions from network card 104 to upgrade control processor 108 to initiate a system capability upgrade. In this example embodiment, network card 104 resides locally with host card 102. Additionally, upgrade control processor 108 is communicatively coupled to remote card 132 by remote card interface 130. In one embodiment, remote card interface 130 is a bi-directional communication link that uses twisted pair cable, optical fiber, coaxial cable, millimeter wave, FSO, or the like to transmit instructions from remote card 132 to upgrade control processor 108 to initiate a system capability upgrade. The remote or local network connectivity provides the ability to initiate a system capability upgrade of host card 102 from any location.

In operation, host card 102 is already functioning with the previously installed version of system operating software currently operating on target processor 124. Target processor 124 provides the instructions for operating communications system 100 via communication interface 126 when card plug in connector 128 is attached to a SDR server (not shown). Prior to system capability upgrade module 103 receiving a request to upgrade the system capability, upgrade control processor 108 receives upgraded system operating software from either network card 104 via network card interface 109 or remote card 132 via remote card interface 130. The upgraded system operating software is transferred from upgrade control processor 108 to program memory switch 118 via upgrade instruction interface 120. In turn, program memory switch 118 transfers the upgraded system operating software to primary program memory 110 of memory device 114 via memory transfer interface 116. As discussed earlier, state machine 119 provides program memory switch 118, e.g. a programmable logic device, with bi-directional data control between memory device 114 and target processor 124. The bi-directional data control enables consistent data transfers within the prescribed time frame and prevents data collisions between memory device 114 and target processor 124. The operation of state machine 119 is further described below with respect to FIGS. 2 and 3.

Once the upgraded system operating software is loaded into the primary program memory 110 of memory device 114, upgrade control processor 108 is instructed by either network card 104 or remote card 132, as described above, to re-initialize the host card 102 with the upgraded system operating software by performing a reset. In addition to the reset command issued by upgrade control processor 108, the system capability upgrade will also occur when power is cycled on host card 102, e.g., host card 102 is restarted, anytime after the upgraded system operating software has been transferred into memory device 114. Once the reset or restart occurs, the sequence of upgrading target processor 124 begins. In one embodiment, system operating software is loaded from primary program memory 110 via program memory switch 118 communicatively coupled to target microprocessor 124. By separating the storing of upgraded system operating software from the actual upgrade operation, the upgrade is performed at any time without interrupting the operation of communications system 100 for the entire length of the upgrade process as described in the '893 application.

Figure 2:
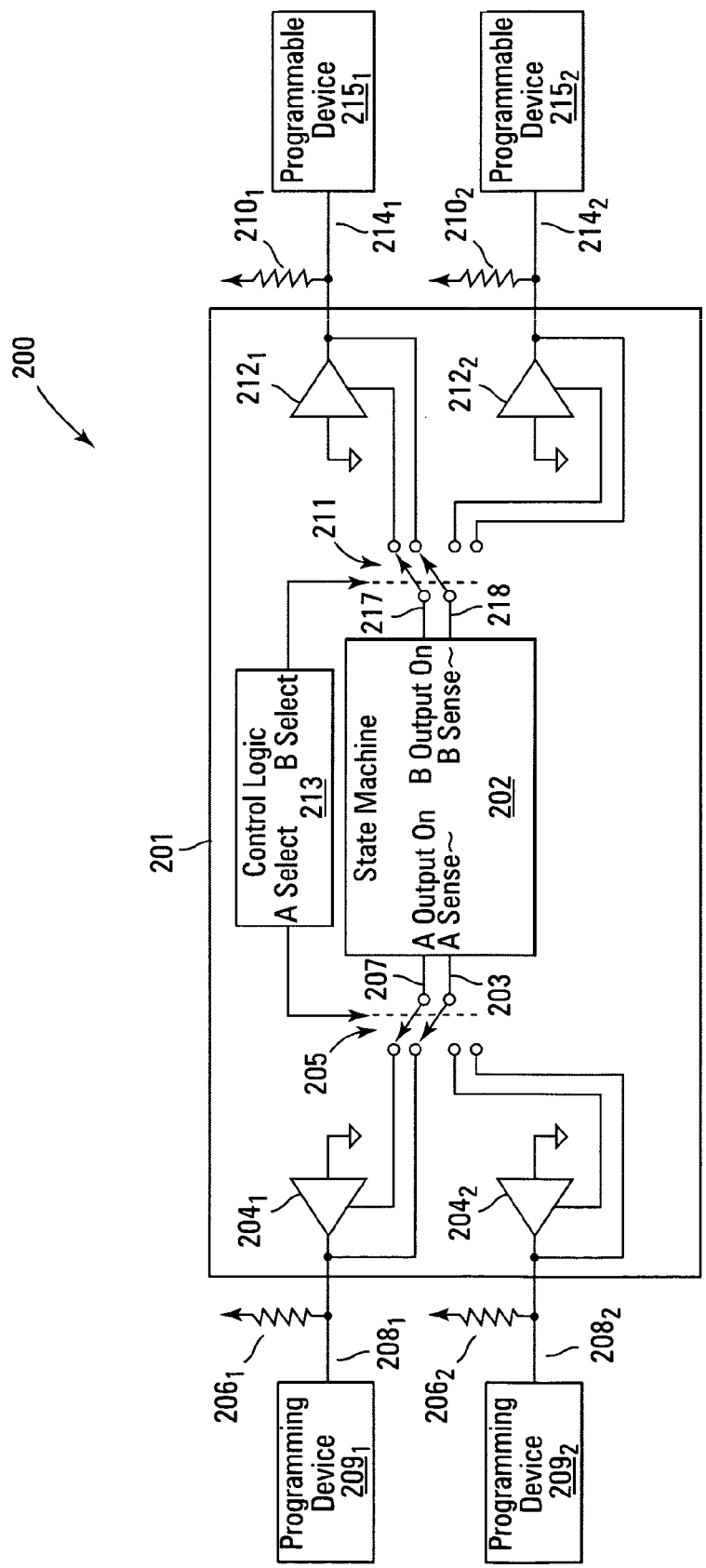
FIG. 2 is a block diagram of an embodiment of a circuit encompassing a state machine for bi-directional data control in accordance with the present invention.

FIG. 2 is a block diagram of an embodiment of a circuit, indicated generally at 200, encompassing a state machine for bi-directional data control according to the teachings of the present invention. Circuit 200 comprises logic device 201 and state machine 202. Circuit 200 represents one embodiment of program memory switch 118 and state machine 119 described above with respect to FIG. 1. State machine 202 consists of programmable logic residing within logic device 201. In one embodiment, logic device 201 is responsible for directing data transfers along bi-directional signal paths $208_1$ and $208_2$, and $214_1$ and $214_2$ between programming devices $209_1$ and $209_2$, and programmable devices $215_1$ and $215_2$, respectively. In one embodiment, each of programming devices $209_1$ and $209_2$ is a microprocessor, a serial programming header, or the like. In one embodiment, each of programmable devices $215_1$ and $215_2$ is a flash memory device, a read only memory (ROM) device, an electrically erasable programmable read only memory (EEPROM) device, or any electrical, magnetic, or optical storage device. It is noted that for simplicity in description, two programmable devices $215_1$ and $215_2$ and two programming devices $209_1$ and $209_2$ are shown in FIG. 2. However, it is understood that circuit 200 supports any appropriate number of programmable devices and programming devices, e.g., at least one of a programmable device and a programming device, in circuit 200.

State machine 202 controls the direction of data transfer along one complete bi-directional data signal path at any one time. In one embodiment, state machine 202 provides bi-directional data control between programming device $209_2$ and programmable device $215_2$. To accomplish this, logic device 201 includes switch 205, communicatively coupled to tri-state control signal path 207 and bi-directional data signal path 203, and switch 211, communicatively coupled to tri-state control signal path 217 and bi-directional data signal path 218. Switch 205 connects bi-directional data signal path 203 and tri-state control signal path 207 with one of bi-directional signal paths $208_1$ or $208_2$. Switch 211 connects tri-state control signal path 217 and bi-directional data signal path 218 with one of bi-directional signal paths $214_1$ or $214_2$. Logic device 201 further includes control logic subcomponent 213. Control logic subcomponent 213 provides switch position instructions for switches 205 and 211. Tri-state buffers $204_1$ and $204_2$ are coupled to external pull-up resistors $206_1$ and $206_2$ coupled to each of bi-directional signal paths $208_1$ and $208_2$. On bi-directional signal paths $214_1$ and $214_2$, circuit 200 includes external pull-up resistors $210_1$ and $210_2$ coupled to tri-state buffers $212_1$ and $212_2$, respectively.

Attempting to connect one of programming devices $209_1$ and $209_2$ to one of programmable devices $215_1$ and $215_2$ through the tri-state buffers $204_1$ or $204_2$ and $212_1$ or $212_2$ without sequential intervention of state machine 202 results in a "crossed feedback" condition. The first time one of programming devices $209_1$ and $209_2$, i.e., a signal source, asserts a logic zero (active low), one of programmable devices $215_1$ and $215_2$, i.e., a signal sink, will drive to logic zero. This forces a reverse drive condition that causes a first data signal from the signal source to remain at logic zero. Both the first data signal and a second data signal at the signal sink will permanently lock into a logic zero state, each of the first data signal and the second data signal feeding from the other signal's active low condition. State machine 202 prevents the crossed feedback condition described above by only allowing one data signal to be driven active at one time.

In one embodiment, logic device 201 receives an instruction from upgrade control processor 108 of FIG. 1 to transfer at least one bit of data from programming device $209_2$ to programmable device $215_2$. Logic device 201 determines that the at least one bit of data originating from programming device $209_2$ on bi-directional signal path $208_2$ will pass through switch 205 on bi-directional data signal path 203 before entering state machine 202. Switch 205 receives an instruction on tri-state control signal path 207 from control logic 213 to connect programming device $209_2$ to state machine 202. Switch 211 receives an instruction on tri-state control signal path 217 from control logic 213 to connect programming device $215_2$ to state machine 202. The at least one bit of data that passes through state machine 202 arrives at programmable device $215_2$ on bi-directional signal path $214_2$ after passing through switch 211 on bi-directional data signal path 218. Similarly, logic device 201 determines that the at least one bit of data or at least one acknowledgment bit originating at programmable device $215_2$ will pass through state machine 202 and arrive at programming device $209_2$. In one embodiment, logic device 201 sets switch 205 and switch 211 to identical positions. Programming device $209_2$ asserts active low to activate an originating data signal on bi-directional signal path $208_2$. Within state machine 202, the originating data signal on bi-directional signal path $208_2$ forces tri-state buffer $212_2$ to be asserted as active low to activate bi-directional signal path $214_2$ to receive the originating data signal. In one embodiment, up to eight bits of data are transferred in sequential order from programming device $209_2$ to programmable device $215_2$ along bi-directional signal path $214_2$. Every ninth bit, the at least one acknowledgement bit is transferred from programmable device $215_2$ back to programming device $209_2$ along bi-directional signal path $214_2$.

The at least one acknowledgement bit originates from programmable device $215_2$ on bi-directional signal path $214_2$, passes through state machine 202, and arrives at programming device $209_2$ on bi-directional signal path $208_2$. To accomplish this, programmable device $215_2$ asserts active low to activate the originating data signal on bi-directional signal path $214_1$. Within state machine 202, an active data signal on bi-directional signal path $214_2$ will cause tri-state buffer $204_2$ to be asserted active low to activate the data destination signal on bi-directional signal path $208_2$. This configuration allows the acknowledge bit to be transferred from programmable device $215_2$ to programming device $209_2$.

When it is determined that the originating data signals on bi-directional signal paths $208_1$ ($208_2$) or $210_1$ ($210_2$) are declared to be in an inactive state, the corresponding tri-state buffers $212_1$ ($212_2$) or $204_1$ ($204_2$) are driven to a state of high impedance. The state of high impedance allows pull-up resistors $206_1$ ($206_2$) or $210_1$ ($210_2$) to assert the originating data signal inactive high. When at least one originating data signal goes inactive, at least one destination data signal also goes inactive. At this point, state machine 202 is ready for the next active data bit in either direction. In one embodiment, the device that asserts first is the device that controls the direction of data transfer.

Figure 3:
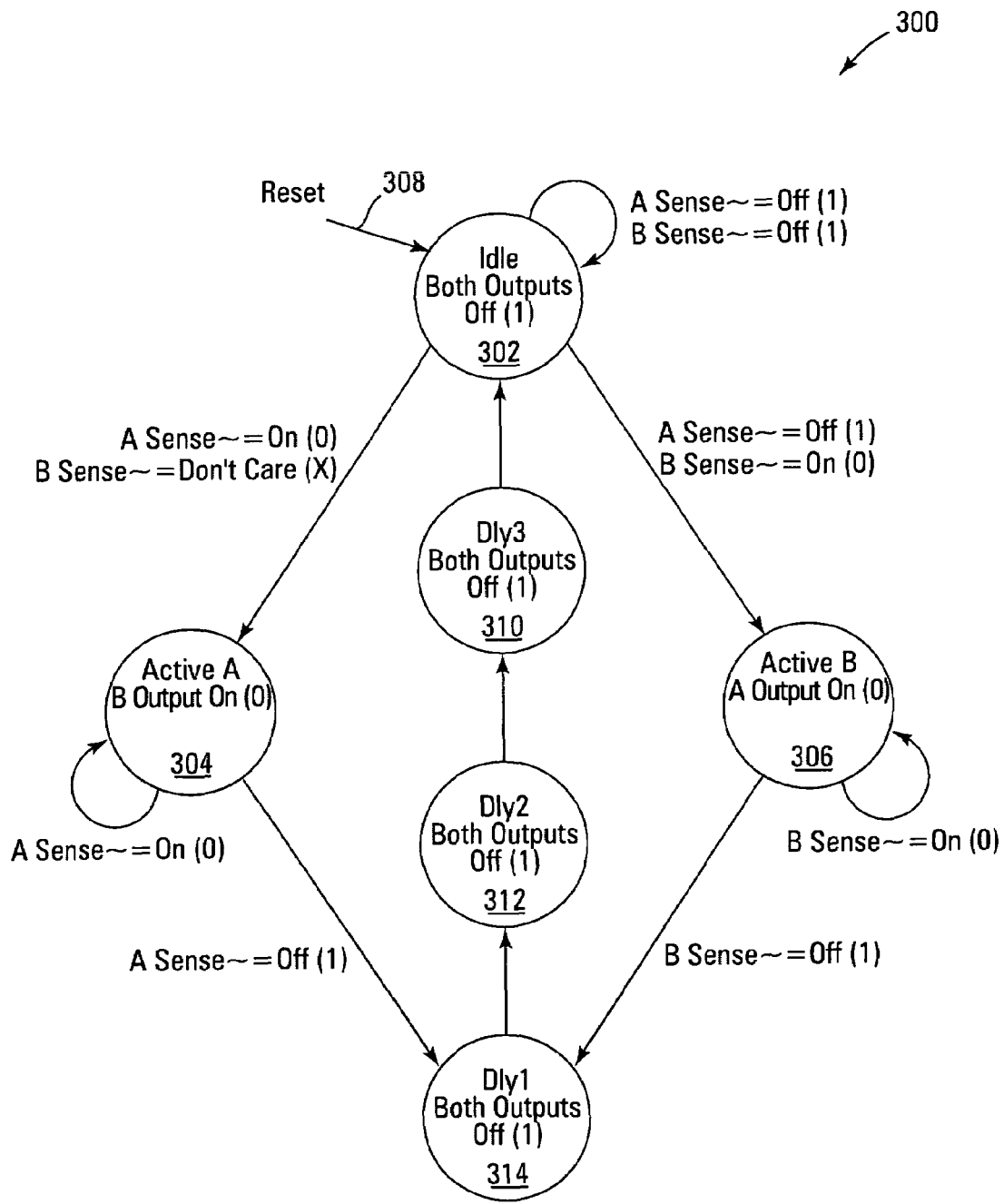
FIG. 3 is a state machine diagram illustrating the functions of a state machine for bi-directional data control in accordance with the present invention.

FIG. 3 is a state machine diagram, indicated generally at 300, illustrating the functions of a bi-directional data control state machine according to the teachings of the present invention. Diagram 300 comprises idle state 302, active states 304 and 306, and at least three delay states 310, 312, and 314. In one embodiment, diagram 300 illustrates the functions of state machine 202 as described with respect to FIG. 2 above. Moreover, each of switches 205 and 211 of FIG. 2 are set to a desired connection. The desired connection facilitates a data transfer between a signal source and a corresponding signal sink as identified above with respect to FIG. 2.

In one embodiment, state machine 202 operates at a high speed capable of transferring a set of system operating software within an allocated time, e.g., the maximum amount of initialization time allowed by communication interface 126 of FIG. 1. In order to minimize pulse width distortion, especially with asynchronous data flow, a clock rate of state machine 202 is significantly faster than a data bit transfer rate. Moreover, the clock rate of state machine 202 is at least 7 to 10 times faster than the data bit transfer rate. In one embodiment, the clock rate of state machine 202 is 71 MHz and the data bit transfer rate varies between 100 kHz and 500 kHz. In the same embodiment, the clock rate of state machine 202 is significantly over 100 times the data bit transfer rate and effects a very small pulse width distortion, i.e., less than 1%.

At idle state 302, the functions of state machine 202 begin. When a first data signal on bi-directional data signal path 203 and a second data signal on bi-directional data signal path 218 are both in an inactive state, state machine 202 resides in idle state 302. In one embodiment, idle state 302 holds the first data signal and the second data signal as input signals. Similarly, when a reset signal is provided by circuit 200 on reset signal path 308, state machine 202 resides in idle state 302. In one embodiment, when the first data signal becomes active, i.e., becomes an originating data signal, before or at the same time as the second data signal, state machine 202 enters active state 304. Moreover, when state machine 202 enters active state 304, the second data signal is forced to an active output condition, i.e., becomes a data destination signal. State machine 202 continues to reside in active state 304 until the first data signal becomes inactive. Once the first data signal returns to an inactive state, state machine 202 enters a series of delay states 314, 312, and 310 prior to reaching idle state 302. During the series of delay states 314, 312, and 310, and idle state 302, both data signals of circuit 200, i.e. the originating data signal and the data destination signal, are turned off. In one embodiment, the originating data signal and the data destination signal are asserted inactive high as described above with respect to FIG. 2. It is noted that within this description, a total of three delay states 314, 312, and 310 are shown in FIG. 3. However, it is understood that state machine 202 supports any appropriate number of delay states, e.g., one or more delay states, in state machine 202.

In one embodiment, delay state 314 corresponds to one clock cycle of logic device 201. Moreover, the additional delay states 310 and 312 are used to compensate for a rise time occurred by the use of pull-up resistor pairs $206_1$ and $210_1$ or $206_2$ and $210_2$ of circuit 200. In one embodiment, pull-up resistor pairs $206_1$ and $210_1$ or $206_2$ and $210_2$ have resistive values that effect a rise time of no more than two clock cycles of state machine 202. In one embodiment, one or more delay states 310, 312, and 314 are required to prevent circuit 200 from entering a state of oscillation prior to a previously-asserted data signal on bi-directional data signal path 218 returning to an inactive state. Moreover, once each of delay states 310, 312, and 314 have occurred, the previously-asserted data signal on bi-directional data signal path 218 has had sufficient time to switch to an inactive state. State machine 202 returns to idle state 302. As stated earlier, upon entering idle state 302, data signal outputs from bi-directional data signal path 203 and bi-directional data signal path 218 are held as inputs.

In one embodiment, when the second data signal becomes active, i.e., becomes the originating data signal, before the first data signal, state machine 202 enters active state 306. Moreover, when state machine 202 enters active state 306, the first data signal is forced to an active output condition, i.e., becomes the data destination signal. State machine 202 continues to reside in active state 306 until the second data signal becomes inactive. Once the second data signal returns to an inactive state, state machine 202 enters the series of delay states 314, 312, and 310 prior to reaching idle state 302. During the series of delay states 314, 312, and 310, and idle state 302, both output signals, i.e. the originating data signal and the data destination signal, are turned off. In one embodiment, the originating data signal and the data destination signal are asserted inactive high as described above with respect to FIG. 2. Once the delay states 310, 312, and 314 have occurred, the second data signal becomes inactive and state machine 202 returns to idle state 302. As stated earlier, upon entering idle state 302, the data signal outputs from bi-directional data signal path 203 and bi-directional data signal path 218 are held as inputs. The operation of state machine 202 as illustrated in diagram 300 prevents any collision of one or more bits of data due to a crossed feedback condition.

What is claimed is:

1. A method for controlling bi-directional data transfers in an electronic circuit, the method comprising:
   determining when a first of at least two data signals is activated as an originating data signal prior to a second of the at least two data signals based on the at least two data signals;
   allowing only a device associated with the first of the at least two data signals to be a signal source;
   causing a device associated with the second of the at least two data signals to enter a receive state as a signal sink; and
   passing at least one bit of data in at least one data transfer from the signal source to the signal sink.

2. The method of claim 1, and further comprising when the second of the at least two data signals is activated as the originating data signal prior to the first of the at least two data signals:

allowing only the device associated with the second of the at least two data signals to be the signal source; and causing the device associated with the first of the at least two data signals to enter the receive state as the signal sink.

3. The method of claim 1, wherein passing the at least one bit of data in the at least one data transfer from the signal source to the signal sink further comprises transferring the at least one bit of data through a programmable logic device.

4. A logic circuit, comprising:

at least one bi-directional data signal path incorporating directional decision logic in the at least one bi-directional data signal path;

at least two switches, each of the at least two switches coupled to the state machine and a control logic;

at least two tri-state buffers, each of the at least two tri-state buffers coupled to the state machine and the control logic by each of the at least two switches; and wherein the directional decision logic includes a number of states for controlling the transfer of at least one bit of data along the at least one bi-directional data signal path between at least one signal source and at least one signal sink based on the at least one bit of data.

5. The circuit of claim 4, wherein the logic circuit further comprises a programmable logic device.

6. The circuit of claim 4, wherein the at least two switches are set to identical switch positions by the control logic subcomponent.

7. The circuit of claim 4, wherein the at least one signal source is one of a microprocessor and a serial programming header.

8. The circuit of claim 4, wherein the at least one signal sink is one of a flash memory, a read only memory, an electrically erasable programmable read only memory, a one time programmable memory, and other electrical, magnetic or optical memory.

9. The circuit of claim 4, wherein the number of states in the state machine include an idle state, at least two active states, and at least one delay state.

10. The circuit of claim 9, wherein the idle state holds at least one first data signal and at least one second data signal as inactive input signals.

11. The circuit of claim 10, wherein only the at least one first data signal or the at least one second data signal enters one of the at least two active states at one time.

12. The circuit of claim 9, wherein the state machine remains in at least one active state until the transfer of at least one bit of the data between the at least one signal source and the at least one signal sink is complete.

13. The circuit of claim 9, wherein the at least one delay state provides sufficient time for a data signal from the at least one signal source or the at least one signal sink to be asserted inactive high.

14. The circuit of claim 9, wherein a reset signal causes the state machine to return to the idle state.

15. A circuit for transferring data, the circuit comprising:

means for sourcing data;

means for asserting the data, responsive to the means for sourcing the data, on at least one first data signal path or at least one second data signal path to control a direction of data transfer;

means for sequencing the data transfer in the first data signal path, responsive to the means for asserting the data; and means for sinking the data, responsive to the means for sequencing the data transfer, from the at least one first data signal path or the at least one second data signal path.

16. The circuit of claim 15, wherein the means for sourcing the data and the means for sinking the data include at least one programmable device or at least one programming device.

17. The circuit of claim 16, wherein the at least one programmable device is one of a flash memory, a read only memory, an electrically erasable programmable read only memory, a one time programmable memory, and other electrical, magnetic or optical memory.

18. The circuit of claim 16, wherein the at least one programming device is one of a microprocessor and a serial programming header.

19. The circuit of claim 15, wherein the means for asserting the data includes a logic circuit comprising:

at least two switches, each of the at least two switches coupled to a state machine and a control logic subcomponent;

at least two tri-state buffers, each of the at least two tri-state buffers coupled to the state machine and the control logic subcomponent by each of the at least two switches; and wherein the state machine includes an idle state, at least two active states, and at least one delay state.

20. The circuit of claim 19, wherein the logic circuit is a programmable logic device.

21. The circuit of claim 15, wherein the means for sequencing the data transfer includes at least one controllable bi-directional data signal path.

22. An electronic system, comprising:

an upgrade control processor, the upgrade control processor adapted to receive instructions to begin a system capability upgrade process;

a host card adapted to include one or more system capability upgrade modules, each upgrade module comprising:

a programmable logic device incorporating a state machine having directional decision logic whereby the state machine controls data transfers using a bi-directional data path;

at least one primary program memory storage medium adapted to receive one or more first sets of system operating software;

at least one secondary program memory storage medium adapted to receive one or more second sets of system operating software; and a target processor, the target processor adapted to receive system operating software from either the at least one primary or the at least one secondary program memory storage medium; and wherein the programmable logic device is instructed by the upgrade control processor to select the contents of either the at least one primary or the at least one secondary program memory storage medium for the data transfer to the target processor along the bi-directional data path controlled by the directional decision logic of the state machine.

23. The system of claim 22, wherein the upgrade control processor comprises one of a field programmable gate array and a microprocessor.

24. The system of claim 22, wherein the at least one primary program memory storage medium comprises one of a flash memory, a read only memory, an electrically erasable programmable read only memory, and other electrical, magnetic or optical memory.

25. The system of claim 22, wherein the at least one secondary program memory storage medium comprises one of a flash memory, a read only memory, an electrically erasable programmable read only memory, and other electrical, magnetic or optical memory.

26. The system of claim 22, wherein the target processor comprises one of a field programmable gate array and a microprocessor.

27. The system of claim 22, wherein the programmable logic device incorporating the state machine comprises one of a complex programmable logic device and a field programmable gate array.

28. An apparatus for controlling bi-directional data transfers in an electronic circuit, the apparatus comprising:
  means for determining when a first of at least two data signals is activated as an originating data signal prior to a second of the at least two data signals based on the at least two data signals;
  means, responsive to the first of the at least two data signals, for allowing only a device associated with the first of the at least two data signals to be a signal source;
  means for causing a device associated with the second of the at least two data signals to enter a receive state as a signal sink; and
  means for passing at least one bit of data in at least one data transfer from the signal source to the signal sink.

29. The apparatus of claim 28, and further comprising when the second of the at least two data signals is activated as the originating data signal prior to the first of the at least two data signals:
  means for allowing only the device associated with the second of the at least two data signals to be the signal source; and
  means for causing the device associated with the first of the at least two data signals to enter the receive state as the signal sink.

30. The apparatus of claim 28, wherein the means for passing the at least one bit of data in the at least one data transfer from the signal source to the signal sink further comprises means for transferring the at least one bit of data through a programmable logic device.

* * * * *